United States Patent [19]

Benedetti

[11] 4,175,303
[45] Nov. 27, 1979

[54] MOLDING CLIP

[75] Inventor: Nicholas M. Benedetti, Sterling Heights, Mich.

[73] Assignee: USM Corporation, Farmington, Conn.

[21] Appl. No.: 867,764

[22] Filed: Jan. 9, 1978

[51] Int. Cl.² ............................................. A44B 21/00
[52] U.S. Cl. .................................... 24/73 FT; 52/718
[58] Field of Search ............ 24/73 B, 73 FT, 73 MF, 24/73 PM, 213 B; 52/717, 718

[56] References Cited
U.S. PATENT DOCUMENTS

| | | | |
|---|---|---|---|
| 2,537,662 | 1/1951 | Flora et al. | 24/73 MF |
| 2,644,607 | 7/1953 | Hinkel | 24/73 FT |
| 3,634,991 | 1/1972 | Barton, Jr. et al. | 52/718 |

FOREIGN PATENT DOCUMENTS

| | | | |
|---|---|---|---|
| 1126218 | 6/1955 | France | 24/73 MF |
| 657791 | 9/1951 | United Kingdom | 52/718 |

Primary Examiner—Kenneth J. Dorner
Attorney, Agent, or Firm—Aubrey C. Brine; Richard B. Megley; Vincent A. White

[57] ABSTRACT

A one piece clip is provided for retaining an elongated molding trim strip in bridging relation with a gap formed between two spaced members. The clip has a pair of resilient arms received in the inturned flange at one end of the molding and a resilient tongue received in the inturned flange at the opposite edge of the molding. A resilient leg of the clip is received in a slotted opening provided in a panel recessed in the gap and includes angled portions which provide for ease of assembly and removal of the clip from a position bridging the spaced members.

5 Claims, 5 Drawing Figures

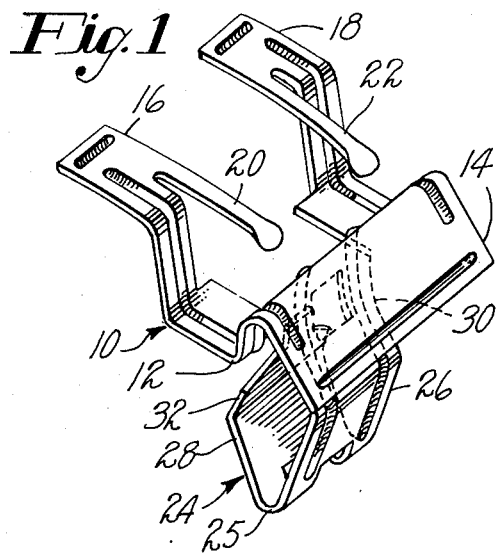
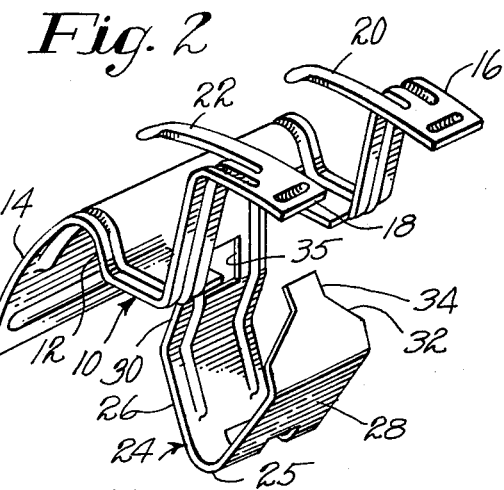
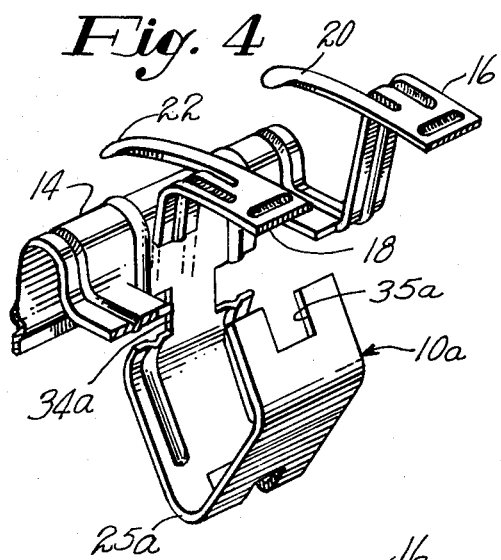
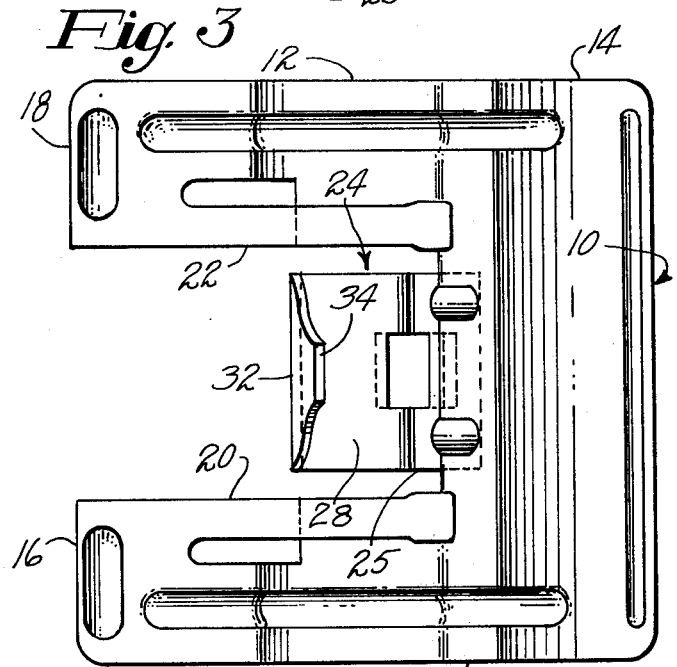
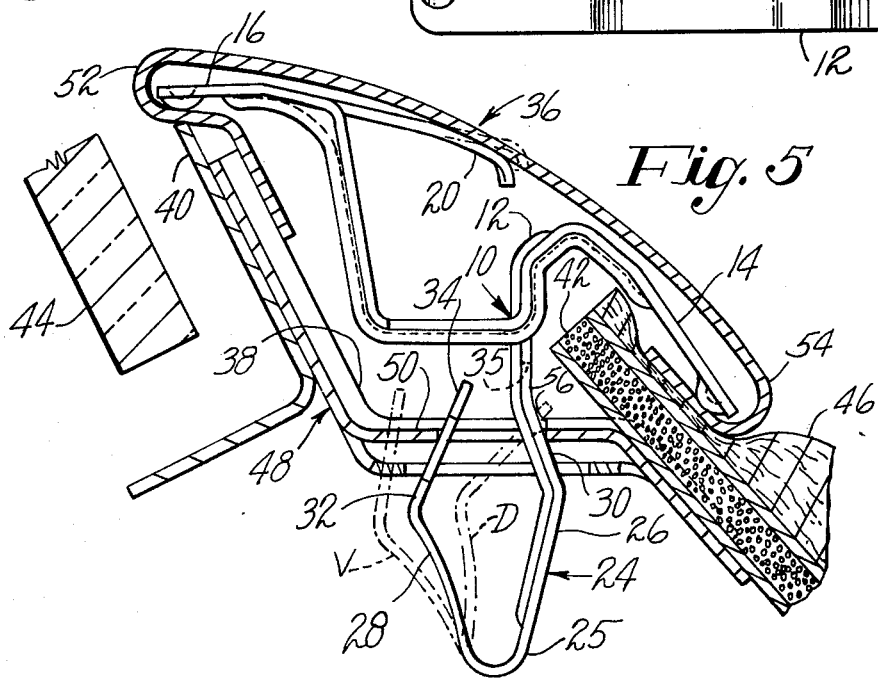

MOLDING CLIP

BACKGROUND OF THE INVENTION

The present invention relates to fasteners and more particularly to a one piece resilient clip for retaining an elongated trim strip on the interior of an automobile, or the like.

In the field of automobile manufacture, it is presently a common practice to provide an elongated trim strip to cover the gap between the interior of the windshield, backlight, or fixed window, and the adjacent body structure, or to bridge the roof side rail and headliner, to maintain a pleasing appearance of the automobile interior. Generally, the trim strip is formed of a chrome-plated sheet metal or other like material, and provides a decorative framework to the window surface area.

Heretofore, this elongated trim strip generally has been fastened with sheet metal screws which are received in a panel disposed in the gap between the window retaining structure and the body structure of the automobile.

While this type of attachment has proved satisfactory in most applications, there are problems which arise due to this type of attachment, which may lead to an undesirable product, or adversely effect the assembly operation.

In attaching the trim strip by means of threaded fasteners, there is always the problem of misalignment, particularly when the trim strip is removed and then reassembled to the automobile interior. Additionally, the requirement that the trim strip be removed and replaced from time to time may require that the fasteners be replaced should the heads of the fasteners become distorted during assembly or removal. Also, the fasteners must be replaced should the mating hole into which the threaded portion of the fastener is inserted become damaged such that a larger thread is needed to retain the fastener in place.

The elongated trim strip is, in many instances, itself distorted by the insertion of fasteners through the openings in the trim strip and therefore does not present as pleasing appearance as is the case where the smooth surface of the trim strip is presented without being subjected to drilling or the force produced by setting a threaded fastener.

It is therefore the object of the present invention to provide a one piece fastener for retaining an elongated trim strip of the type described onto the interior surface of an automobile adjacent a backlight, windshield or other glass structure.

A further object of the invention is to provide a one piece clip for retaining an elongated trim strip in bridging position over a gap between two spaced members wherein the clip is attached to a panel disposed within the gap.

A further object of the invention is to provide a one piece clip of the type described which is re-usable, easy to manufacture, and which facilitates assembly and disassembly of the elongated trim strip relative to the adjacent structure in the interior of an automobile.

SUMMARY OF THE INVENTION

The above objects and other objects which will be apparent as the description proceeds are achieved by providing a one piece clip for retaining an elongated molding trim strip in bridging position over a gap between two spaced members wherein the clip is attached to a panel disposed in the gap. The clip comprises a body portion having means for retaining the clip onto the underside of the trim strip with the clip disposed in the gap. A resilient leg extends downwardly from the body portion into the gap with the retaining means engaged onto the trim strip bridging the gap. The leg is of resilient material and substantially diamond shaped cross-section and has a lower V-shaped portion comprising a bight from which extend a pair of divergent leg portions and an upper portion comprising a pair of convergent leg portions, one of said upper leg portions connecting the leg to the body portion. Another of the upper leg portions terminates in a free end in spaced relation with the one upper leg portion. The lower leg portion facilitates entry of the leg into a slotted opening in a panel disposed in the gap, and the upper leg portion serves to retain the leg in the slotted opening with the lower leg portion extending entirely through the slotted opening.

BRIEF DESCRIPTION OF THE DRAWING

For a more complete understanding of the invention reference should be made to the following description of a preferred embodiment taken in conjunction with the accompanying drawing, wherein:

FIG. 1 is a front perspective view showing a clip constructed in accordance with the teachings of the present invention;

FIG. 2 is a rear perspective view showing the clip of FIG. 1 rotated through one hundred and eighty degrees to better reveal details thereof;

FIG. 3 is a top plan view of the clip of FIGS. 1 and 2 taken on an enlarged scale for clarity;

FIG. 4 is a rear perspective view similar to FIG. 2 showing an alternative embodiment of the invention; and FIG. 5 is an elevational view, taken along the same scale as FIG. 3, partially in section and phantom lines, showing the clip of FIGS. 1 through 3 in the assembled position.

DESCRIPTION OF A PREFERRED EMBODIMENT

Referring now to the drawing and in particular to FIGS. 1, 2 and 3, there is shown a one piece clip 10 which is fabricated preferably from spring steel, or other suitable resilient material. The clip 10 comprises a body portion 12 having a tongue 14 substantially the same length as the body portion and extending laterally from the body portion. At the opposite side of the body 12 a pair of arms 16 and 18 extend outwardly in the opposite direction from that of the tongue 14. The arms 16 and 18 are spaced one from the other, and are substantially parallel one with the other.

At the inner side of the arms 16 and 18 there is located a pair of spring fingers 20 and 22 which extend back towards the tongue 14 and lie substantially in the same plane as the arms 16 and 18.

Referring particularly to FIG. 2, it will be noted that a resilient leg 24, substantially diamond shaped in cross-section, projects downwardly from the body 12 of the clip 10. The leg 24 terminates at a bight 25 from which extends a pair of divergent lower leg portions 26 and 28. At the midsection of the leg 24 the lower leg portions 26 and 28 connect to a pair of upper leg portions 30 and 32 which are convergent to form respective obtuse angles therewith. The upper leg portion 30 serves to connect the resilient leg 24 onto the body 12 of the fastener, and the upper leg portion 32 terminates at a free end which comprises a tab 34 having a substantially rectangular surface. The upper leg portion 30 is provided with a rectangular opening 35 formed therein which extends partially into the body 12 and is of a width greater than the width of the tab 34 to accommodate the tab 34, as will be explained in detail below.

Referring now to FIG. 4, there is shown an alternate arrangement of the present invention wherein like reference numerals designate like elements as those shown in the embodiment of FIGS. 1 through 3. As will be evident fromm the configuration shown, the clip 10a is provided with a rectangular opening 35a formed at the upper leg portion 32, and a tab 34a is formed in the upper leg portion 30. The rectangular opening 35a is of a width greater than the tab 34a to accommodate receiving the tab as in the clip 10 structure. Thus, the clip 10a is similar to the clip 10 but for the mating elements described above being reversed as to their location on the upper leg portions 30 and 32.

Referring now to FIG. 5, there is shown a typical environment in which the present invention is employed, to assemble an elongated trim strip 36 onto an automobile interior structure. As shown, the trim strip 36 is employed to bridge a gap 38 formed between a pair of panel members 40 and 42. The panel member 40 may comprise the structure adjacent a fixed window panel 44, while the panel member 42 in the embodiment is an interior panel having a decorative vinyl cover 46, as shown. A Z-shaped structural member 48 comprises a panel 50 which extends throughout the length of the gap to support the member 42 relative the the member 40.

The trim strip 36 is provided at either edge thereof with inturned flanged 52 and 54 which contact the panel members 40 and 42 when the trim strip is positioned over the gap 38. In assembling the trim strip 36 to the automobile interior, a plurality of resilient clips 10 are assembled onto the trim strip 36 with the arms 16 and 18 disposed within the inturned flange 52 and the tongue 14 received in the flange 54. To facilitate assembling of the clips 10 onto the strip 36, the inturned flange 54 may be notched or cut away the width of the tongue 14 at points along its length allowing the fasteners to be inserted at that point and moved along the length of the strip until firmly engaged with the arms 16 and 18 retained in the flange 52, the tongue 14 retained in the flange 54 and the pair of spring fingers 20 and 22 contacting the inner surface of the trim strip. As will be noted in FIG. 5, the spring fingers 20 and 22 are disposed such that they are resiliently deflected by the inner surface of the strip 26 to resiliently hold the clip 10 in a set position along the length of the strip 36.

As is further evident from FIG. 5, a plurality of slotted openings 56 are provided in the panel 50 at selected positions along the panel. To assemble a trim strip 36 onto the automobile interior the clips 10 are positioned along the trim strip 36 to align with the openings 56 in the panel 50. The resilient clips 10 are each attached to the panel 50 by forcing the leg 24 through the opening 56 to a position wherein the trim strip 36 is firmly seated against the panel member 40 and the panel member 42, as shown.

In FIG. 5, the undistorted position of the clip 10 is shown in phantom and designated by the letter U, while the maximum distorted position of the leg 24 of the clip 10 designated by the letter D is also shown. In order to provide an angle between the lower leg portions 26 and 28 which allows ease of entry of the leg 24 into the opening 56, and to provide an angle between the upper leg portions 30 and 32 which serves to firmly retain the leg within the opening 56 yet allows removal of the leg from the panel 50, the maximum distorted position D of the leg causes an interference between the upper leg portions 30 and 32. To accommodate the maximum distorted position D of the portions 30 and 32, the opening 35 is provided in the upper leg 30 and the tab 34 is provided in the upper leg 32. The upper leg 32 including the tab 34 serves to retain the leg 25 in the opening 56, yet allows the portions 30,32 to assume the position shown at D of FIG. 5, during entry of the fastener into the opening. The leg construction shown allows the clip 10 to be used in structures wherein there is a variation in slot width of the opening 56 of up to 0.090 inches.

The clip 10 shown provides a fastener for use with a trim strip 36 of the general type employed in automobile construction which eliminates the need for sheet metal screws and provides a pleasing appearance to the finished assembly. The fastener leg construction described above also provides for an angle of the upper leg portions 30 and 32 which is not so steep an angle as to destroy the fastener upon removal, yet is steep enough so that the fastener is not easily pulled off while in use.

I claim:
1. A clip for retaining an elongated trim strip in a bridging position over a gap between two spaced members wherein the clip is attached to a panel disposed within the gap, comprising a body portion having a pair of resilient arms extending outwardly from one side thereof for engagement with one edge of the elongated trim strip, and a resilient tongue extending outwardly from the opposite side of said body portion for engagement with the opposite edge of the trim strip, a resilient leg extending downwardly from said body portion into said gap with said arms and said tongue engaged in said trim strip bridging said gap, said leg being of substantially diamond shaped cross-section and having a lower V shaped portion comprising a bight from which extends a pair of divergent lower leg portions and an upper portion comprising a pair of convergent upper leg portions, a first of said upper leg portions connecting said leg to said body portion to form an obtuse angle with one of said lower leg portions and a second of said upper leg portions connected to the other of said lower leg portion to form an obtuse angle therewith and terminating in a free end in spaced relation with said first upper leg portion, whereby said lower leg portion facilitates entry of said leg into a slotted opening in said panel disposed in said gap and upper leg portion serves to retain said leg in said slotted opening with said lower leg portion extending entirely through said slotted opening, and a pair of elongated spring fingers disposed one on each of said arms and extending generally toward said tongue and crosswise of a portion of a trim strip having one edge thereof engaged with said arms and the opposite edge engaged with said tongue.

2. A clip as set forth in claim 1 wherein one of said upper leg portions has an opening formed therein adjacent the other upper leg portion free end and said other upper leg portion free end terminates in a tab having a width less than said upper leg portion opening to provide for entry of said tab through said upper leg portion opening to facilitate said clip leg passage through said panel slotted opening.

3. A clip as set forth in claim 2 wherein said opening is formed in said first upper leg portion and said tab is formed in said second upper leg portion.

4. A clip as set forth in claim 2 wherein said opening is formed in said second upper leg portion and said tab is formed in said first upper leg portion.

5. A clip as set forth in claim 4 wherein said clip is manufactured from spring steel material.

* * * * *